April 11, 1939.   H. C. TURNER ET AL   2,154,156
ELECTRIC MICROMETER
Filed July 6, 1937

INVENTORS.
Henry C. Turner
Thomas C. Nuttall
ATTORNEY.

Patented Apr. 11, 1939

2,154,156

UNITED STATES PATENT OFFICE 2,154,156

ELECTRIC MICROMETER

Henry Cobden Turner, Salford, Manchester, and Thomas Cayton Nuttall, South Norwood, London, England, assignors to The General Electric Company Limited, London, England Application July 6, 1937, Serial No. 152,202
In Great Britain July 6, 1936

5 Claims. (Cl. 175—183)

This invention relates to electric micrometers for measuring or indicating the thickness of metal foil and the like of the type in which the foil is introduced between a transmitter, generating electric oscillations, and a receiver, thereby producing modifications of the signal received by the receiver which are an indication of the thickness of the foil.

The object of this invention is to improve electric micrometers of this known type, more particularly in the following respects:—(i) reduction of errors due to variation in the position of the foil, (ii) increase of sensitivity or ability to detect small changes in thickness, (iii) protection of the apparatus from overloads, (iv) reliability, (v) simplicity.

Figure 1:
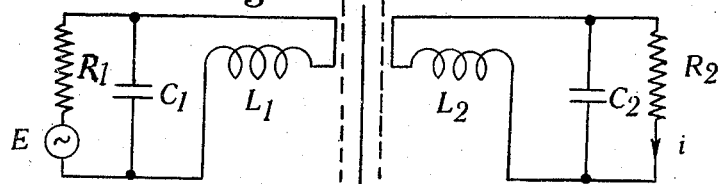
Figure 2:
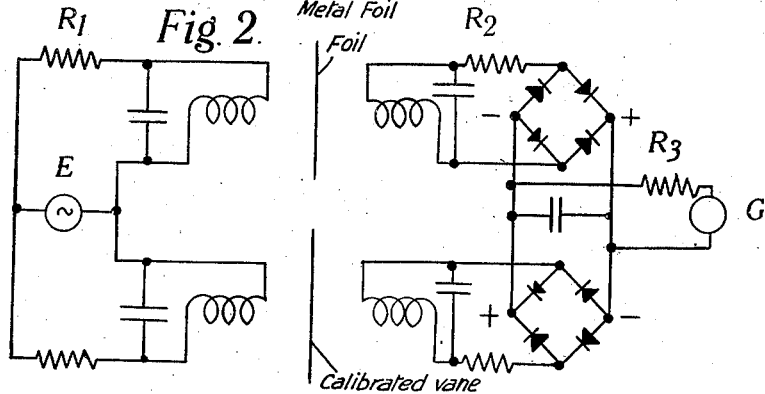
Figure 3:
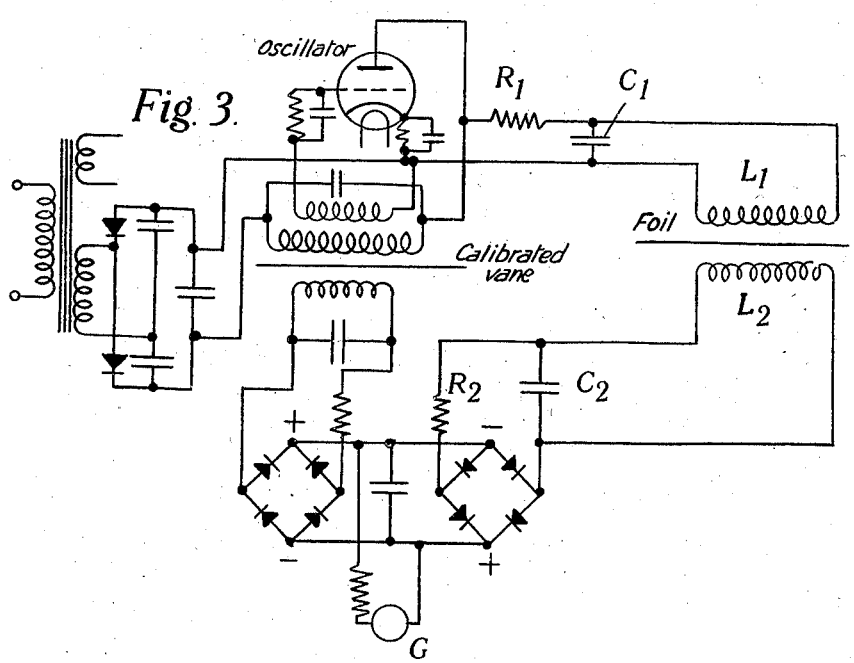

In the accompanying drawing, Figure 1 is a diagram of the usual electric micrometer circuit; Figure 2 is a diagram of a compensated electric micrometer circuit including opposed bridge rectifiers and Figure 3 is a more complete diagram of the circuits of the improved electric micrometer.

We have found that an essential condition for attaining (i) is that the transmitter and receiver should be symmetrical. Thus in Figure 1 of the accompanying drawing, which shows diagrammatically the arrangement usually employed in electric micrometers, E being the oscillation generator, it is important that the components $L_1$, $L_2$, $C_1$, $C_2$, $R_1$, $R_2$ should be related by the equation $$L_1/L_2 = C_2/C_1 = R_1/R_2 \quad (1)$$

$R_1$ and $R_2$ are to be taken to represent the total effective shunt resistance in each circuit. Symmetry in respect of the L's and C's has probably been obtained before; but the need for symmetry in respect of the R's appears not to have been recognised. Although ideally the foil should be positioned mid-way between the transmitter and receiver coils, that is in the position indicated at A, no appreciable errors will be introduced if this position is shifted as for example to position B or C.

It should be explained that the two circuits, comprising $L_1$, $C_1$, $R_1$, and $L_2$, $C_2$, $R_2$, are so arranged that upon introducing the foil whose thickness is to be measured between the coils of the circuits the mutual inductance between these coils is changed and the effective resistance of each circuit is increased. Provided that the range of movement of the foil is small, the mutual inductance remains substantially independent of the foil's position and dependent, for a given material, on the thickness of the foil. In practice the movement of the foil away from a central position is limited to, say plus or minus ⅛th inch, and the gap between the coils is ¾ to ⅞ inch. The effect of movement of the foil is to cause changes in the effective resistance value of the coils. The values of $R_1$ and $R_2$ can be adjusted so that there is practically no change of output when the foil is moved within the gap between the coils. It is then found that the values of the various components of the circuits satisfy the relationship given. Actually in practice the values of the effective resistances are adjusted until there is substantially no deflection of the needle of the indicating instrument when the foil is moved within the above mentioned limits between the coils.

According to the invention an electric micrometer is electrically symmetrical in the sense just explained.

Object (ii) is known to be promoted by using compensation methods, in which the disturbance in the receiver associated with one transmitter by the presence of the foil is compensated by the disturbance produced in another similar receiver associated with another similar transmitter by the presence of some calibrated object, such as a movable vane. We have found that, in such a compensated arrangement, the outputs of the two receivers are best applied to a pair of opposed bridge rectifiers, the out-of-balance D. C. current being applied to a galvanometer. Such an arrangement is shown in Figure 2 of the accompanying drawing. Here a common input E feeds two circuits, one associated with the foil to be examined and the other with a calibrated vane, the latter forming the compensating circuit. The outputs of the two receivers are applied to the pair of opposed bridge rectifiers in the manner shown. Since the D. C. terminals of the rectifiers are connected in opposition, each rectifier tends to shunt the D. C. output of the other rectifier. This shunting effect is negligible under normal conditions, that is when the out-of-balance current is small, so that it does not affect the sensitivity. When the out-of-balance current is larger, the resistance of the shunting rectifier decreases and shunts a larger part of the current, thus protecting the galvanometer G; a resistance $R_3$ is provided and its value is adjusted suitably to control the current at which this shunting effect comes into operation; accordingly the sensitivity of the apparatus can be regulated by its use.

In this figure, $R_1$ and $R_2$ are to be taken also as representing the total effective shunt impedance in their respective circuits.

According to a second feature of the invention a compensated circuit is used in which the outputs of the two receivers are applied to two bridge rectifiers, connected in opposition, and the out-of-balance D. C. current is applied to a current-measuring instrument.

The remaining objects (iii), (iv), (v) are promoted by using dry-plate rectifiers as the rectifiers. For these are cheap, simple and stable.

According to a subsidiary feature of the invention, the rectifiers in a micrometer possessing the second of the said features are dry-plate rectifiers.

Figure 3 of the accompanying drawing shows the general arrangement of an electric micrometer embodying all the desirable features aforesaid. It requires no detailed explanation, except perhaps to make clear that the resistances and/or capacitances may be adjustable in order to allow for correction of the relation given above.

We claim:—

1. An electric micrometer comprising means for generating oscillations of uniform frequency, two transmitter circuits connected in parallel with said oscillations generating means for simultaneous operation, each transmitter circuit including a primary inductor coil having a resistor in series therewith and a condenser across the terminals thereof, the total resistance of each of the transmitter circuits being substantially the same, two receiver circuits arranged for cooperation with said transmitter circuits respectively, each receiver circuit comprising a secondary inductor coil having a resistor in series therewith and a condenser across the terminals thereof, the total resistance of each of the receiver circuits being substantially the same and in each receiver circuit the total resistance being in predetermined ratio to the total resistance of the corresponding transmitter circuit, the cooperating primary and secondary coils of the respective transmitter and receiver circuits being spaced apart one to receive therebetween the foil to be tested and the other a calibrated vane, a bridge rectifier in each of said receiver circuits, circuit connections between said bridge rectifiers arranged so that the direct currents of the rectifiers are in opposition and a galvanometer connected across said circuit connections for measuring the direct current difference between said rectifiers.

2. An electric micrometer as in claim 1 wherein the total resistances of the cooperating transmitter and receiver circuits are directly proportional to the inductance of the primary and secondary coils and inversely proportional to the capacities of the condensers across said primary and secondary coils.

3. An electric micrometer as in claim 1 wherein said bridge rectifiers comprise dry-plate rectifiers.

4. An electric micrometer as in claim 1 wherein a resistor is provided in circuit with said galvanometer to protect the latter from excess current.

5. An electric micrometer as in claim 1 wherein said bridge rectifiers comprise dry-plate rectifiers subject to reverse current discharge when said current difference exceeds a predetermined amount, said reverse discharge being adapted to protect the galvanometer, and a resistor in circuit with the galvanometer is adapted to limit the current to the galvanometer.

HENRY COBDEN TURNER.
THOMAS CAYTON NUTTALL.